United States Patent [19]

Elam

[11] Patent Number: 5,732,960
[45] Date of Patent: Mar. 31, 1998

[54] WHEEL DOLLY

[76] Inventor: Eric Elam, 349 Kennedale-Sublett Rd., Kennedale, Tex. 76060-2819

[21] Appl. No.: 496,431

[22] Filed: Jun. 29, 1995

[51] Int. Cl.[6] .................................................. B60B 29/00
[52] U.S. Cl. .................. 280/79.4; 254/113; 414/426; 414/429
[58] Field of Search ........................ 280/38, 46, 43.11, 280/43.17, 43.29, 47.34, 79.11, 79.4; 414/426, 429, 428; 254/113, 114, 8 R

[56] References Cited

U.S. PATENT DOCUMENTS

| | | | |
|---|---|---|---|
| 2,461,479 | 2/1949 | Moffat | 280/43.17 |
| 2,807,380 | 9/1957 | Bohnke | 280/46 |
| 2,880,431 | 4/1959 | Noland | 280/43.17 |
| 3,685,125 | 8/1972 | DePierre . | |
| 4,664,398 | 5/1987 | Mozer . | |
| 4,664,399 | 5/1987 | Mobley et al. | 280/43.17 |
| 4,690,605 | 9/1987 | Coccaro . | |
| 4,692,082 | 9/1987 | Smith . | |
| 4,696,484 | 9/1987 | Casey | 280/43.17 |
| 4,846,484 | 7/1989 | Nekola . | |
| 4,854,803 | 8/1989 | Coccaro . | |
| 4,925,357 | 5/1990 | Cisternino et al. | 414/428 |
| 4,976,449 | 12/1990 | Lotspeich et al. | 280/79.4 |
| 5,018,930 | 5/1991 | Hardin et al. | 280/43.11 |
| 5,049,025 | 9/1991 | Roman . | |
| 5,112,070 | 5/1992 | Hahn | 280/79.4 |
| 5,151,004 | 9/1992 | Johnson | 254/8 R |
| 5,176,487 | 1/1993 | Flitton . | |

FOREIGN PATENT DOCUMENTS

| | | | |
|---|---|---|---|
| 2419177 | 11/1979 | France . | |
| 547301 | 3/1932 | Germany | 280/46 |
| 520051 | 4/1940 | United Kingdom . | |

*Primary Examiner*—Brian L. Johnson
*Assistant Examiner*—Min Yu
*Attorney, Agent, or Firm*—Stephen R. Greiner

[57] ABSTRACT

A dolly for lifting and transporting an automobile. The dolly is provided with a generally U-shaped frame including a base member and a pair of arm assemblies pivotally attached thereto. Each of the arm assemblies includes a load-bearing arm extending at substantially right angles from the base member and a torsion arm secured to the load-bearing arm. A pry bar is removably attached to the torsion arm for pivoting the load-bearing arm, which engages the wheel assembly of the automobile, to lift and transport the automobile. Secured to each of the load-bearing arms are casters to facilitate pivoting of the load-bearing arm and to provide for movement of the dolly over the ground surface. Latching mechanisms secured to the base member selectively secure the arm assemblies in a fixed position in which the automobile is in an elevated position and the casters are in rolling engagement with the ground surface.

17 Claims, 3 Drawing Sheets

WHEEL DOLLY

FIELD OF THE INVENTION

The present invention relates generally to a wheel-type article handler and transporter.

BACKGROUND OF THE INVENTION

As is well known by the operators of tow trucks, repair garages and body shops, the movement of automobiles in confined areas such as those found in parking lots and driveways can be extremely difficult. Dollies have been developed, however, which permit an engaged automobile to moved freely between nearby obstacles. These dollies are typically capable of lifting a single, automobile wheel assembly from the ground surface and, once raised, transporting such by means of attached casters.

One dolly that has enjoyed widespread acceptance utilizes a U-shaped frame mounted on casters. This particular frame is provided with telescoping body members having a pair of outwardly extending arms rigidly affixed thereto and between which the tire of a wheel assembly may be positioned for lifting. A ratcheting mechanism enables a user to manually raise or lower the wheel assembly from the ground surface by moving the body members and affixed arms, respectively, toward or away from one another. So that the arms do not bind against the tire during engagement therewith, supplemental rollers must also be secured to said arms.

The aforesaid dolly has not been altogether satisfactory during use and has proven to be deficient in several significant ways. First, the ratcheting mechanism is noisy and time consuming in its actuation. During the repossession of an automobile from a confined space where speed and stealth are of the essence, for instance, a user is oftentimes put at risk of physical attack while the ratcheting mechanism is being employed. Second, the rollers required to prevent binding of the opposed arms against a tire present the dolly with a relatively tall profile, on the order of 5 inches, thereby precluding use beneath the ground-hugging bodies of many sports cars found on the road today. Finally, the ratcheted movement of the outwardly extending arms toward one another, so as to lift a wheel assembly, greatly reduces the wheel base of the dolly making such subject to upset when inadvertently brought into contact with pavement surface distortions or cracks. Total upset of the dolly can, in addition to rendering the dolly inoperative, damage an associated automobile.

SUMMARY OF THE INVENTION

In light of the deficiencies presented by the prior art dollies, it is a principal object of the invention to provide a wheel dolly that can silently raise an automobile wheel assembly from the ground surface to transport height in seconds and with minimal effort expended by a user.

It is another object of the invention to provide a wheel dolly having an ultra-low profile capable of being readily positioned beneath the bodies of sports cars and other land vehicles for use.

It is a further object of the invention to provide a wheel dolly with a U-shaped frame having a fixed wheel base capable of lifting and transporting an automobile wheel assembly without risk of upset or damage to the associated automobile.

It is an object of the invention to provide improved elements and arrangements thereof in a wheel dolly for the purposes described which is lightweight, inexpensive, dependable and fully effective in accomplishing its intended purposes.

Briefly, the wheel dolly in accordance with this invention achieves the desired objects by featuring a generally U-shaped frame including a base member and a pair of spaced arm assemblies pivotally attached thereto. Each of the arm assemblies includes a load-bearing arm extending at substantially right angles from the base member and a torsion arm secured to the load-bearing arm. A pry bar is removably attached to the torsion arm for pivoting the load-bearing arm, which engages the wheel assembly of an automobile, to lift and transport the automobile. Secured to each of the load-bearing arms are casters to facilitate pivoting of the load-bearing arm and to provide for movement of the dolly over the ground surface. The dolly also features unique latching mechanisms secured to the base member to selectively secure the arm assemblies in a fixed position in which the automobile is lifted from the ground surface and the casters are in rolling engagement with the ground surface.

The foregoing and other objects, features and advantages of the invention will become readily apparent upon further review of the following detailed description of the preferred embodiment, as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
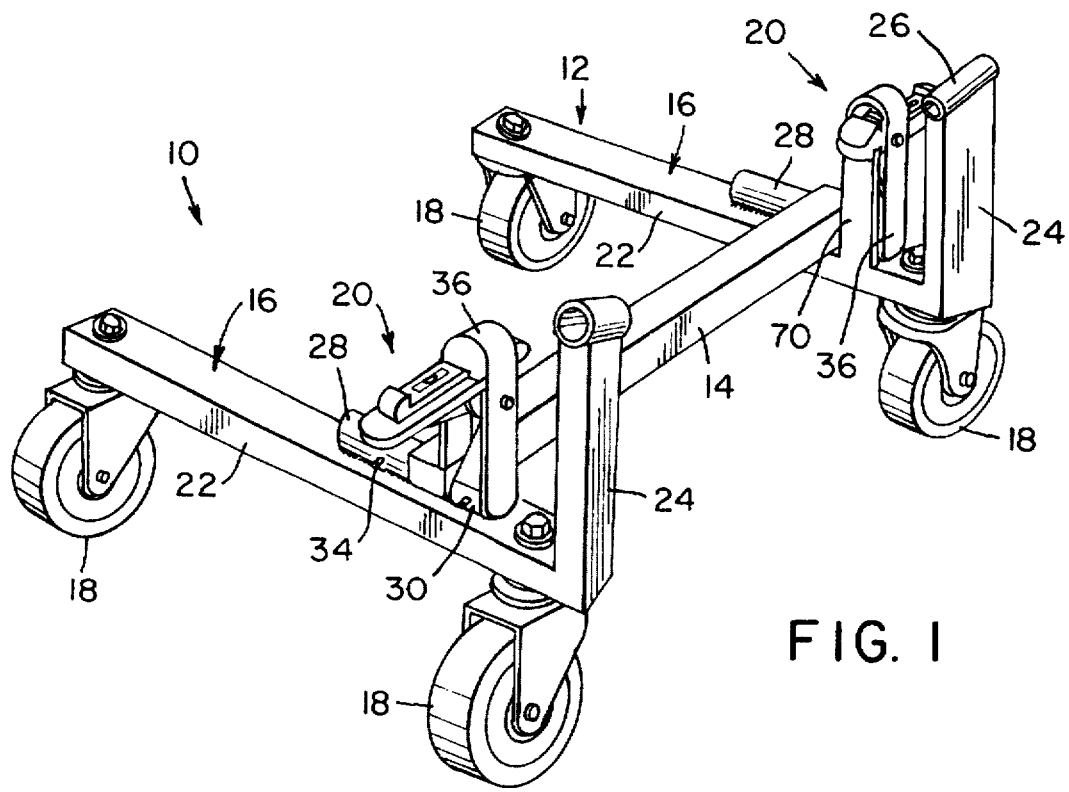
FIG. 1 is a first perspective view of a wheel dolly in accordance with the present invention.
Figure 2:
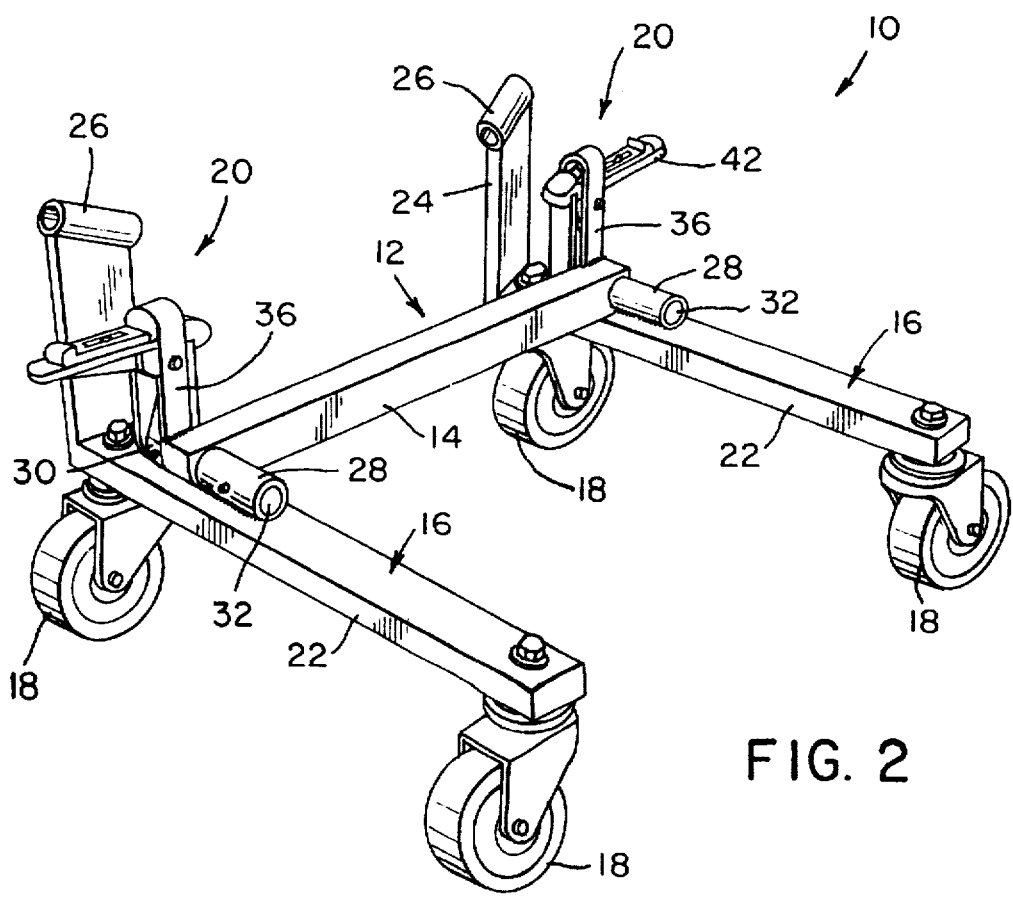
FIG. 2 is a second perspective view of the wheel dolly of FIG. 1.

Referring now to FIGS. 1 and 2, a wheel dolly in accordance with the present invention is shown generally at 10. The wheel dolly 10 is provided with a generally U-shaped frame 12 including a base member 14 having a pair of arm assemblies 16 pivotally attached to the opposing ends thereof. Secured to the bottom of each of the arm assemblies 16 in a spaced-apart relationship is a pair of casters 18 for movement over the ground surface. A spring-biased latching mechanism 20 is joined to each of the opposing ends of the base member 14 adjacent each of the arm assemblies 16 for locking the arm assemblies in an elevated position with the casters 18 oriented for movement over the ground surface.

As shown, the base member 14 and arm assemblies 16 are constructed from pieces of metallic tubing each having a rectangular cross-sectional configuration. The base member 14 preferably has a length on the order of 18 inches, adequate for use in lifting a typical automobile wheel assembly. The preferred arm assemblies 16, on the other hand, each include a load-bearing arm 22, of approximately 18 inches in length, to one end of which is welded a torsion arm 24 having a length of approximately 7 inches. Of course, the length of either the base member 14 or the arms 22 and 24 may be scaled upwardly or downwardly, as desired, to permit the arms 22 and 24 to be positioned closely adjacent the front and rear sides of a tire having a larger or smaller size.

Figure 6:
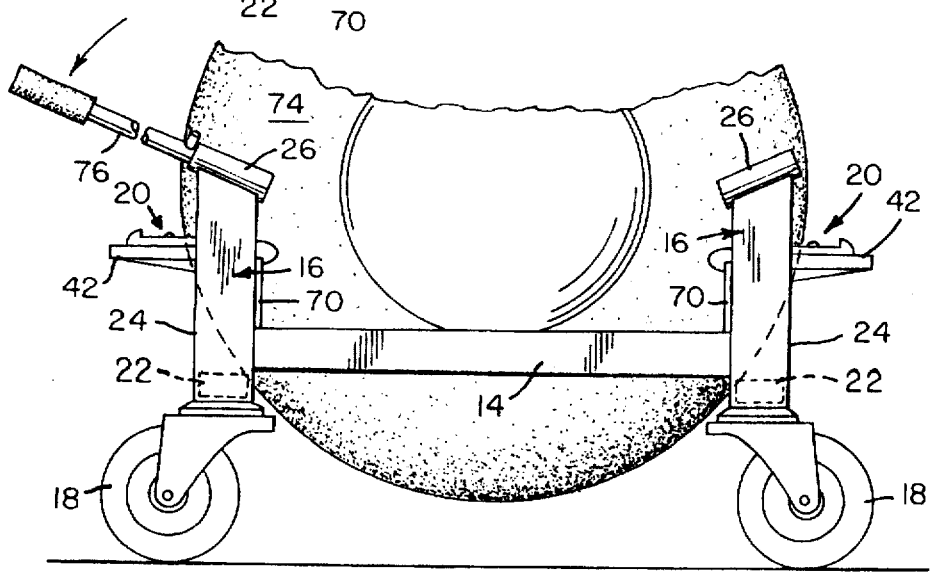

The torsion arms 24 each have a tubular socket member 26 secured by welding to its free end. Preferably, the longitudinal axis of the socket member 26 is oriented both upwardly and outwardly away from the center of the frame 12 when the arm assemblies 16 are in an elevated position as shown in FIGS. 1, 2 and 6. Thus, for maximum strength and ease of manufacture, each socket member 26 is joined to a corresponding torsion arm 24 at a preferred angle of about 20 degrees from normal and, likewise, each torsion arm 24 is secured to a corresponding load-bearing arm 22 at a preferred angle of approximately 20 degrees from normal.

A pair of bushings 28 and 30 are preferably welded to each of the load-bearing arms 22 in a spaced-apart relationship capable of closely accommodating one end of the base member 14 therebetween. Each of the bushings 28 and 30 preferably comprises a relatively short piece of cylindrical tubing defining an aperture between each of the ends thereof. Within the respective apertures of each pair of bushings 28 and 30 is pivotally positioned a portion of a close-fitting rod 32 which extends transversely through the base member 14 and outwardly from both sides thereof. To secure the rod 32 in place within the bushings 28 and 30, the rod 32 is preferably welded to the base member 14. Suitable fittings 34 may be provided to the sides of the bushings 28 and 30 for the application of lubricating grease to each of the rods 32 in the conventional manner.

Latching mechanisms 20 are rigidly secured to each end of the base member 14 for locking the arm assemblies 16 in an elevated position. Each latching mechanism 20 is provided with a housing 36 comprising a strip of stiff metal formed into the shape of an inverted "U" with a pair of opposed side walls 38 and 40 of unequal length. As shown in the FIG. 3, the shorter side wall 38 is welded to the top of the base member 14. The relatively longer side wall 40, on the other hand, is welded to the end of the portion of rod 32 extending through the bushing 30.

Figure 3:
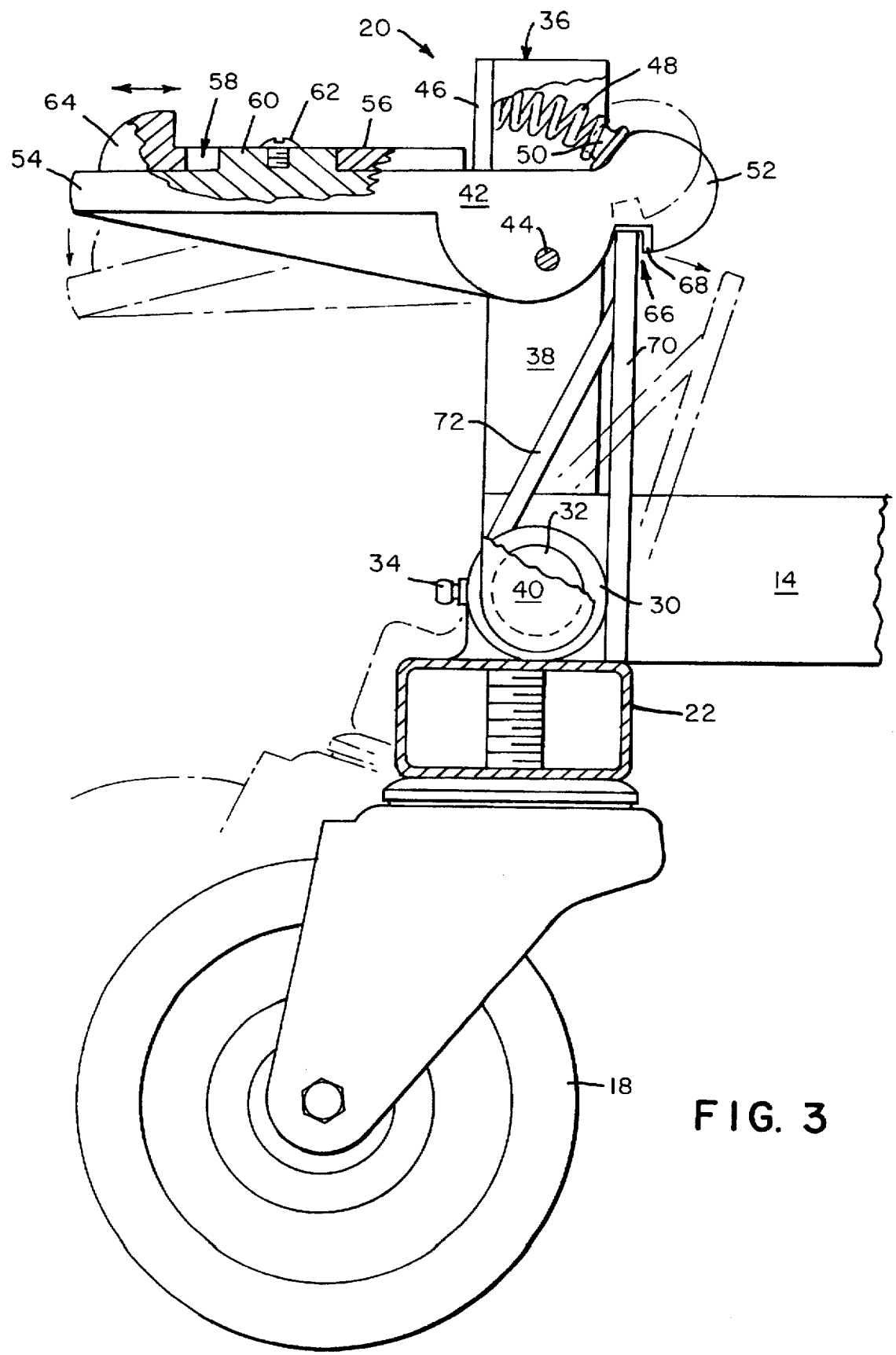
FIG. 3 is a side elevational view of the latching mechanism of the wheel dolly having portions broken away to reveal details thereof.

With continuing reference to FIG. 3, a lever 42 may be seen to pivot on a pin 44 extending between the side walls 38 and 40. To limit the pivoting movement of the lever 42, a stop wall 46 is welded to the housing 36 and extends between the respective tops of side walls 38 and 40. A compressed spring 48 having one of its ends positioned against the stop wall 46 and the other about an integral projection 50 extending from the notched portion 52 of the lever 42, normally biases the handle portion 54 of the lever 42 against the bottom of the stop wall 46.

An axially movable slide 56 is secured to the upper surface of the lever 42 for locking the latching mechanism 20 in an "open" position for reasons which will become apparent hereinbelow. As shown, the slide 56 includes a longitudinal slot 58 between its top and bottom surfaces adapted to closely receive an integral tongue 60 extending upwardly from the upper surface of the handle portion 54. A screw 62, having a head with a width greater than that of the longitudinal slot 58, is threadably fastened to the tongue 60 to secure the slide 56 to the handle portion 54. A contoured thumb portion 64 at the end of the slide 56, remote from the stop wall 46, permits the slide to be readily moved beneath the stop wall 46 when the lever 42 is rotated to the position indicated by broken lines in FIG. 3. When then lever 42 is subsequently released to the pressure exerted by the spring 48 with the slide 56 displaced as described, the slide 56 will retain the handle portion 54 and the stop wall 46 in a fixed, spaced-apart relationship.

The lever 42 includes a notch 66 in its bottom surface closely adjacent the pin 44. To reinforce, and reduce wear upon, the notch 66, such is preferably lined with an insert 68 having a durable tungsten alloy composition. As shown, the notch 66 is adapted to receive the free end of a locking bar 70 welded to both the upper surface of the load-bearing arm 22 and to one side of the bushing 30. For added strength, a support bar 72 is preferably welded in place to angularly connect the free end of the locking bar 70 with the opposite side of the bushing 30.

Figure 4:
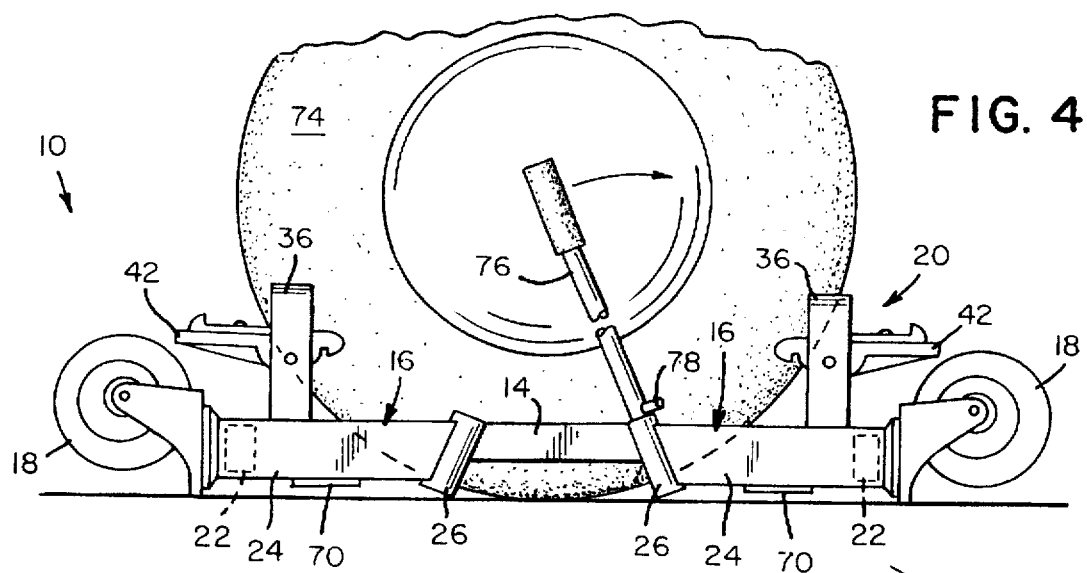
FIGS. 4 to 6 are a sequence of side elevational views of the wheel dolly at various points in the wheel assembly lifting process.
Figure 5:
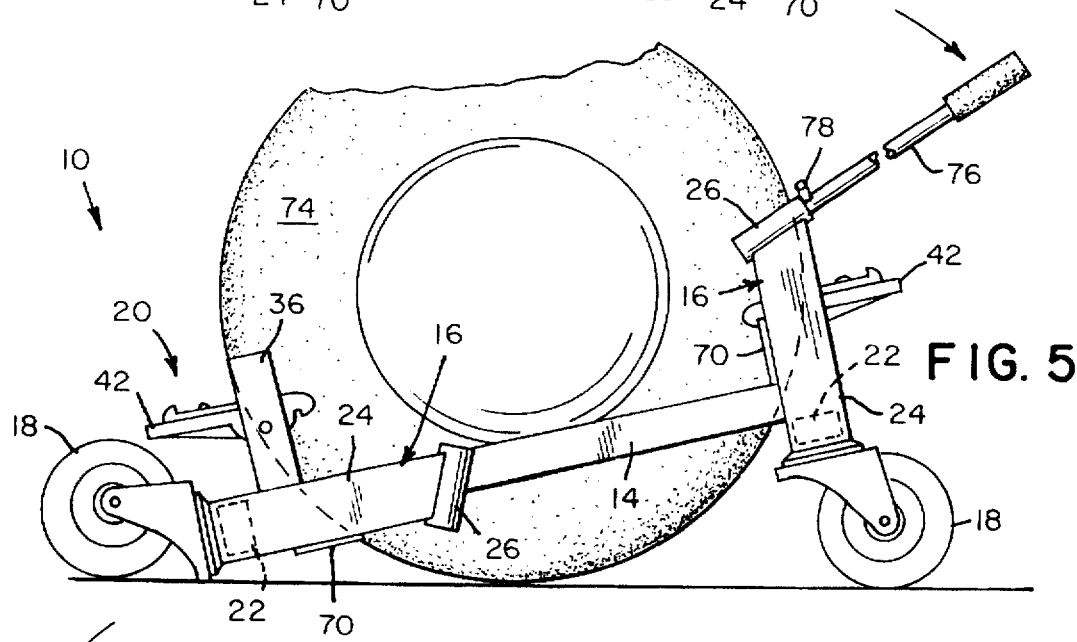

As is shown in FIGS. 4 through 6, the wheel assembly of an automobile including tire 74 may be easily elevated from the ground surface by the wheel dolly 10. In order to accomplish this task, the dolly 10 must first be positioned adjacent the tire 74 with its load-bearing arms 22 adjacent the front and rear sides thereof in a reclined orientation adjacent the ground surface. A pry bar 76, preferably having an outwardly extending stop 78 near its engagement end, is then inserted into one of the socket members 26 as shown in FIG. 4. The angled orientation of the longitudinal axis of the socket members 26, described above, positions the pry bar 76 in an optimal attitude away from the tire 74 for use.

By manually rotating the pry bar 76, the engaged arm assembly 16 is elevated to a vertical orientation and locked in place by the latching mechanism 20 as shown in FIG. 5. With the arm assemblies 16 now snugly engaging the front and rear sides of the tire 74, the pry bar 76 is inserted into the socket member 26 of the one arm assembly 16 remaining in a reclined position. As shown in FIG. 6, the tire 74 is then lifted from the ground surface by rotation of the pry bar 76 which elevates the reclining arm assembly 16 to a vertical orientation retained by latching mechanism 20. The entire lifting process can be accomplished by a user in a few seconds.

To disengage the wheel dolly 10 from the wheel assembly after use, a light force may be applied to the free end of each lever 42 of latching mechanism 20 to unlock it. Under the influence of gravity, the arm assemblies 16 will quickly rotate to their original reclined positions upon the ground surface. However, with the pry bar 76 inserted in the socket member 26 of the arm assembly 16 being unlocked, the arm assembly can be lowered in a slower, controlled fashion.

A pair of dollies 10 are required to manually transport an automobile down a slightly inclined surface. To accomplish this task, one of the dollies 10 is first utilized to lift the wheel assembly on the downhill side of the automobile in the usual manner. The remaining dolly 10 is then partially secured to the corresponding wheel assembly on the opposite side of the automobile. In this regard, the arm assembly 16 nearest the intended direction of travel of the automobile is elevated to a vertical and locked position. The latching mechanism 20 associated with the reclining arm assembly 16 is secured in an "open" position by axially moving the slide 56 into a position between the lever 42 and stop wall 46 as described above. Now, by alternatingly raising and lowering the wheel assembly, the tire thereof may used as a brake as the automobile is being moved in the desired direction. Should control of the automobile for any reason not be maintained during transport by this method, pressure to the pry bar 76 need only be released to fully brake the automobile.

While the invention has been described with a high degree of particularity, it will be appreciated by those skilled in the art that numerous modifications and substitutions may be made thereto. For instance, this inventor is aware of the fact that various locking arrangements could be substituted for the latching mechanism 20 described hereinabove without materially affecting the operation of the invention. Therefore, it is to be understood that the present invention is not limited to the sole embodiment described above, but encompasses any and all embodiments within the scope of the following claims.

I claim:

1. A dolly for lifting and transporting a wheel assembly over the ground surface, said dolly comprising:

a base member having opposing sides;

a pair of spaced arm assemblies pivotally secured to said base member, each of said arm assemblies having a load-bearing arm extending at substantially right angles from said base member and a torsion arm secured to said load-bearing arm for selectively pivoting said load-bearing arm;

a pair of spaced casters secured to each said load-bearing arm to facilitate pivoting of said load-bearing arm and to provide for movement of said dolly over the ground surface; and, a releasable latching mechanism secured to said base member adjacent each of said arm assemblies for selectively securing said arm assemblies in a latched, elevated position to allow transport of the wheel assembly or a released, lowered position to disengage the wheel assembly.

2. The dolly according to claim 1 wherein said torsion arm has a socket adapted to receive one end of a pry bar for pivoting said load-bearing arm.

3. The dolly according to claim 2 wherein said socket, which has a longitudinal axis, is angled to receive the pry bar in an inward and downward direction relative to said base member along said longitudinal axis when said dolly is in its lowered position.

4. The dolly according to claim 1 further comprising:

a pair of first bushings, one of said first bushings secured to each of said load-bearing arms adjacent one side of said base member;

a pair of second bushings, one of said second bushings secured to each of said load-bearing arms adjacent the opposing side of said base member; and, a pair of rods positioned transversely through said base member, each of said rods pivotally fitted within one said first bushing and one said second bushing.

5. The dolly according to claim 4 wherein each said latching mechanism includes:

a housing having a first side wall secured to said base member and a second side wall opposite said first side wall and, a lever pivotally carried by a pin extending between said first and second side walls, said lever having a top surface and a bottom surface and a notch in said bottom surface adapted to engage a projection on said arm assembly.

6. The dolly according to claim 5 wherein said latching mechanism further comprises a compressed spring having opposed ends, one of said ends engaging said housing and the other of said ends engaging the upper surface of said lever for biasing said lever against said projection on said arm assembly.

7. The dolly according to claim 6 wherein said latching mechanism further comprises an axially movable slide secured to said top surface of said lever for selectively contacting said housing so as to selectively prevent engagement of said notch with said projection on said arm assembly.

8. A wheel dolly, comprising:

a generally U-shaped frame including:

an elongated base member having opposed ends;

a pair of arm assemblies, one of said arm assemblies pivotally secured to each of said opposed ends of said base member, each of said arm assemblies having a load-bearing arm extending at right angles from said base member and a torsion arm secured to said load-bearing arm for selectively pivoting said load-bearing arm;

a plurality of casters secured to each said load-bearing arm; and, a pair of latching mechanisms, one of said latching mechanisms secured to each of the opposed ends of said base member for selectively securing said arm assemblies in a fixed position with said casters in rolling engagement with a surface.

9. The wheel dolly according to claim 8 wherein said torsion arm has a socket adapted to receive one end of a pry bar for pivoting said load-bearing arm.

10. The wheel dolly according to claim 8 wherein each said latching mechanism includes:

a housing having a first side wall secured to said base member and a second side wall opposite said first side wall; and, a lever pivotally carried by a pin extending between said first and second side walls, said lever having a top surface and a bottom surface and a notch in said bottom surface adapted to engage a projection on said arm assembly.

11. The wheel dolly according to claim 10 wherein said latching mechanism further comprises a compressed spring having opposed ends, one of said ends engaging said housing and the other of said ends engaging the upper surface of said lever for biasing said lever against said projection on said arm assembly.

12. The wheel dolly according to claim 11 wherein said latching mechanism further comprises an axially movable slide secured to said top surface of said lever for selectively contacting said housing so as to retain said notch in said bottom surface of said lever at a distance from said projection on said arm assembly.

13. A wheel dolly, comprising:

a base member;

a pair of arm assemblies pivotally secured to said base member, each of said arm assemblies having a load-bearing arm extending at right angles from said base member and a socket member secured to said load-bearing arm, said socket member adapted to receive one end of a pry bar for pivoting said load-bearing arm;

a plurality of casters secured to each said load-bearing arm; and, a latching mechanism secured to said base member adjacent each of said arm assemblies for selectively securing said arm assemblies in a fixed position with said casters in rolling engagement with a surface.

14. The wheel dolly according to claim 13 further comprising a torsion arm secured to said load-bearing arm for selectively pivoting said load-bearing arm about a substantially horizontal axis, said torsion arm carrying said socket member at its free end.

15. The wheel dolly according to claim 13 wherein each said latching mechanism includes:

a housing having a first side wall secured to said base member and a second side wall opposite said first side wall; and, a lever pivotally carried by a pin extending between said first and second side walls, said lever having a top surface and a bottom surface and a notch in said bottom surface adapted to engage a projection on said arm assembly.

16. The wheel dolly according to claim 15 wherein said latching mechanism further comprises a compressed spring having opposed ends, one of said ends engaging said housing and the other of said ends engaging the upper surface of said lever for biasing said lever against said projection on said arm assembly.

17. The wheel dolly according to claim 16 wherein said latching mechanism further comprises an axially movable slide secured to said top surface of said lever for selectively contacting said housing so as to retain said notch in said bottom surface of said lever at a distance from said projection on said arm assembly.

* * * * *